(12) United States Patent
Schmitt et al.

(10) Patent No.: US 7,473,737 B2
(45) Date of Patent: Jan. 6, 2009

(54) MIXTURE FOR THE PRODUCTION OF TRANSPARENT PLASTIC MATERIALS, TRANSPARENT PLASTIC MATERIALS, AND METHOD FOR THE PRODUCTION AND USE THEREOF

(75) Inventors: Bardo Schmitt, Mainz (DE); Patrik Hartmann, Buettelborn (DE)

(73) Assignee: Roehm GmbH & Co. KG, Darmstadt (DE)

( * ) Notice: Subject to any disclaimer, the term of this patent is extended or adjusted under 35 U.S.C. 154(b) by 365 days.

(21) Appl. No.: 10/532,823

(22) PCT Filed: Jul. 10, 2004

(86) PCT No.: PCT/EP2004/007623

§ 371 (c)(1),
(2), (4) Date: Apr. 26, 2005

(87) PCT Pub. No.: WO2005/033157

PCT Pub. Date: Apr. 14, 2005

(65) Prior Publication Data

US 2006/0052564 A1 Mar. 9, 2006

(30) Foreign Application Priority Data

Sep. 12, 2003 (DE) ................. 103 42 521

(51) Int. Cl.
C08J 3/00 (2006.01)
C08K 3/20 (2006.01)
C08F 18/08 (2006.01)
C08F 118/02 (2006.01)
C08L 75/00 (2006.01)
C08G 8/30 (2006.01)

(52) U.S. Cl. ................. 525/123; 523/106; 524/589; 525/123; 525/455; 526/289; 526/319; 526/222; 526/321

(58) Field of Classification Search .......... 523/106; 526/286, 289, 321, 319, 222; 524/589; 525/123, 525/455
See application file for complete search history.

(56) References Cited

U.S. PATENT DOCUMENTS 5,214,116 A 5/1993 Matsuoka et al.
5,384,379 A 1/1995 Bader et al.
6,342,571 B1 * 1/2002 Smith et al. ............... 526/286
7,144,954 B2 * 12/2006 Schmitt et al. ............ 525/123

OTHER PUBLICATIONS

U.S. Appl. No. 10/529,478, filed Mar. 28, 2005, Schmitt et al.
U.S. Appl. No. 10/509,328, filed Oct. 7, 2004, Schmitt et al.

* cited by examiner

*Primary Examiner*—Randy Gulakowski
*Assistant Examiner*—Michael M Bernshteyn
(74) *Attorney, Agent, or Firm*—Oblon, Spivak, McClelland, Maier & Neustadt, P.C.

(57) ABSTRACT

The present invention relates to mixtures for preparing transparent plastics, encompassing
a) compounds of the formula (I) and (II)

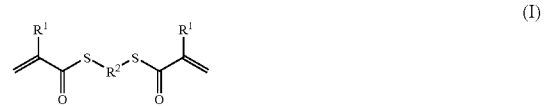

(I)

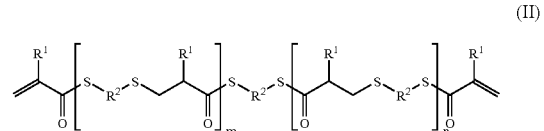

(II)

where each $R^1$, independently of the others, is hydrogen or a methyl radical,
each $R^2$, independently of the others, is a linear or branched, aliphatic or cycloaliphatic radical,
or a substituted or unsubstituted aromatic or heteroaromatic radical, and each of m and n, independently of the other, is a whole number greater than or equal to 0, where m+n>0, and
b) at least one monomer (A) capable of free-radical polymerization with a molar mass of at least 150 g/mol, which contains at least two terminal olefinic groups,
where at least two of the olefinic groups of the monomer (A) have, in the α- and/or β-position with respect to the olefinic group, atoms which differ in nature and/or number, in the radical which connects the at least two olefinic groups.

32 Claims, No Drawings

MIXTURE FOR THE PRODUCTION OF TRANSPARENT PLASTIC MATERIALS, TRANSPARENT PLASTIC MATERIALS, AND METHOD FOR THE PRODUCTION AND USE THEREOF

The present invention relates to mixtures for preparing transparent plastics. The present invention further relates to transparent plastics which can be prepared from the mixtures, and to a process for their preparation. The present invention also relates to the use of transparent plastics for producing optical, especially ophthalmic, lenses.

Spectacles have become an essential component of everyday life. Among these, spectacles with plastics lenses have in particular gained importance recently, because they weigh less and are less breakable than spectacle lenses composed of inorganic materials, and can be coloured by means of suitable dyes. The production of plastics spectacle lenses generally uses high-transparency plastics obtainable, by way of example, from diethylene glycol bis(allyl carbonate) (DAC), thiourethane compounds having α,ω-terminated multiple bonds or sulphur-containing (meth)acrylates.

DAC plastic has very good impact strength and transparency, and good processibility. However, a disadvantage is that the relatively low refractive index $n_D$ of about 1.50 requires that both the centre and the edges of these plastics lenses be reinforced, the spectacle lenses being correspondingly thick and heavy. This markedly reduces the wearer comfort of spectacles with DAC plastics lenses.

DD 298645 describes, by way of example, thiourethane prepolymers having α,ω-terminated multiple bonds, obtained via reaction of α,ω-difunctional thiourethane prepolymers bearing two isocyanate groups with unsaturated compounds which have H atoms with zerevitinoff activity. Possible applications mentioned for the thiourethane prepolymers are transparent layers or high-adhesion films. DD 298645 does not disclose any use as optical or ophthalmic lenses.

The plastics spectacle lenses described in JP 5-215995 are obtained via free-radical copolymerization of a ternary composition composed of an α,ω-di(meth)acrylate-terminated thiourethane compound which has S-(phenyl-S)$_2$ units, trimethylolpropane tris(beta-thiopropionate) and divinylbenzene. Although the refractive index of the resultant plastics is relatively high ($n_D \geq 1.58$), the lenses have the disadvantage of a comparatively low Abbe number in the range from 28 to 36. An excessively low Abbe number leads to a relatively high level of dispersion and to colouring at the edges, and these plastics lenses therefore have only limited suitability as an aid to vision. JP 5-215995 says nothing about the impact strength of the plastics lenses, or about their Vicat point.

Similar considerations also apply to the plastics disclosed in the specification WO 01/36506, which are obtained via free-radical polymerization of monomers having at least two (meth)acryloyl groups, the monomers also having thiourethane linkages and/or dithiourethane linkages within the molecule. The polymer given by way of example has a refractive index of 1.60 and an Abbe number of from 34 to 35. Again, this specification gives no information concerning the Vicat point of the plastics.

Another group of transparent plastics for optical applications is disclosed in EP 0810210. Here, the sulphur-containing (meth)acrylate monomers used, unlike the compounds described above, do not formally derive from hydroxyalkyl (meth)acrylates, but from mercaptoalkyl(meth)acrylates. The plastics described in EP 0810210 have improved impact strength and a high refractive index $n_D$ in the range from 1.589 to 1.637. The Abbe number is only slightly higher than that of The plastics described in JP 5-215995, being from 27.5 to 40.7. The plastics disclosed in EP 0810210 therefore again have only limited suitability for spectacle lenses. Again, this specification gives no information concerning the Vicat point of the plastics.

The specification DE 4234251 discloses sulphur-containing polymethacrylates which are obtained via free-radical copolymerization of a monomer mixture composed of compounds of the formula (1) and (2)

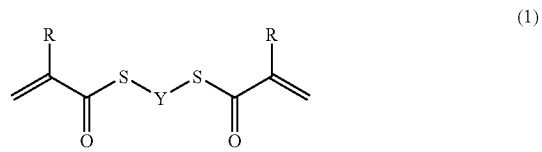

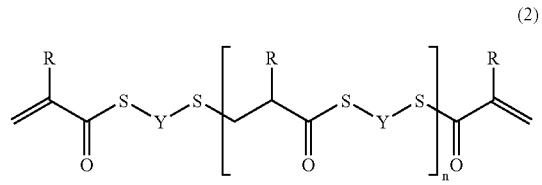

Here, Y is an unbranched or branched, acyclic or cyclic alkyl radical having from 2 to 12 carbon atoms, or an aryl radical having from 6 to 14 carbon atoms, or an alkaryl radical having from 7 to 20 carbon atoms, and the carbon chains here may have interruption by one or more ether or thioether groups. R is hydrogen or methyl and n is a whole number in the range from 1 to 6.

According to DE 4234251, the monomers of the formula (1) and (2) generally have a molar ratio of from 1:0.5 to 0.5:1. The monomer mixture is prepared via reaction of at least two mols of (meth)acryloyl chloride or (meth)acrylic anhydride with one mole of a dithiol, by reacting the (meth)acryloyl chloride or (meth)acrylic anhydride in an inert organic solvent and the dithiol in aqueous alkaline solution. Suitable solvents mentioned are methyl tert-butyl ether, toluene and xylene, the dielectric constant of these at 20° C. being 2.6, 2.4 and, respectively, from 2.3 to 2.6.

The plastics described in DE 4234251 are colourless, rigid and slightly brittle and have a high refractive index $n_D$ in the range from 1.602 to 1.608. The Abbe number is from 35 to 38. These plastics too, therefore, have only limited suitability for spectacle lenses. Again, this specification gives no information concerning the Vicat point of the plastics.

The specification WO 03/011925 describes the polymerization of thiomethacrylates with polyethylene glycol derivatives. The resultant plastics may be used, inter alia, for producing optical lenses. A disadvantage of these lenses is their mechanical properties. In particular, for example, impact strength is insufficient for many requirements.

In the light of the prior art, it was then an object of the present invention to provide mixtures for preparing transparent plastics which are suitable as a material for optical lenses, where the plastics have ideal mechanical properties, in particular high impact strength, together with a high refractive index, preferably greater than 1.58, and a maximum Abbe number, preferably greater than 36. In particular, it should be possible to produce plastics spectacle lenses which have a low level of dispersion and no colouring at the edges.

The present invention was also based on the object of providing a starting material composition for preparing a high-transparency plastic with improved mechanical properties, even at temperatures above room temperature. In particular, the Vicat point of the inventive plastic should be maximized, preferably being above 50.0° C., measured to ISO 306.

It was therefore an object of the present invention to provide a high-transparency plastic which can be prepared from the starting material composition in a simple manner, on an industrial scale and at low cost. In particular, it should be obtainable via free-radical polymerization from a mixture which is flowable at atmospheric pressure and temperatures in the range from 20.0 to 80.0° C.

Another object on which the present invention was based was to provide application sectors and possible uses for the inventive high-transparency plastic.

A mixture with all of the features of Patent claim 1 achieves these objects, and also achieves other objects which, although not explicitly mentioned, are readily derivable or deducible from the circumstances discussed in the introduction. Advantageous modifications of the inventive mixture are protected in the subclaims dependent on claim 1. Other subject matters claimed are the high-transparency plastics obtainable from the inventive mixtures, and also a process for their preparation. The use claim protects a preferred use of the inventive high-transparency plastic. Another product claim describes an optical, preferably ophthalmic, lens which comprises the inventive high-transparency plastic.

A monomer (A) present in a mixture for preparing transparent plastics and encompassing at least two olefinic groups which, in the α-position and/or β-position with respect to the olefinic group, have atoms which differ in nature and/or number provides a route which is not readily foreseeable to mixtures encompassing a) compounds of the formula (I) and (II)

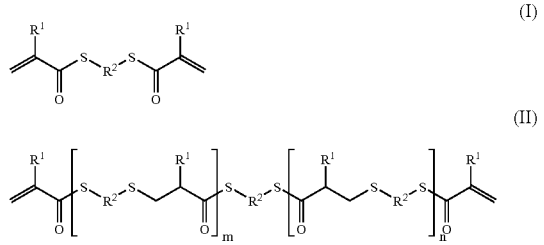

where each $R^1$, independently of the others, is hydrogen or a methyl radical, each $R^2$, independently of the others, is a linear or branched, aliphatic or cycloaliphatic radical, or a substituted or unsubstituted aromatic or heteroaromatic radical, and each of m and n, independently of the other, is a whole number greater than or equal to 0, where m+n>0, and b) at least one monomer (A) capable of free-radical polymerization with a molar mass of at least 150 g/mol, which contains at least two terminal olefinic groups, which are suitable for preparing transparent plastics having excellent mechanical and optical properties. The inventive transparent plastic has a previously unknown combination of exceptional properties, such as high refractive index, high Abbe number, good impact strength, and also high Vicat point. The corresponding plastics spectacle lenses have a low level of dispersion; no colouring at the edges is observed.

The inventive transparent plastic also has further advantages. Among these are:

Since the inventive plastic has high refractive index, there is no requirement for reinforcement and therefore thickening of the centre and of the edges of corresponding plastics spectacle lenses, and there is a marked increase in the wearer comfort provided by these spectacles, due to the comparatively low weight.

The very good impact strength of the inventive plastic protects the corresponding plastics spectacle lenses from the "risks of everyday life". In particular in the case of thin spectacle lenses, it is very unlikely that mechanical forces will cause impairment or irreparable damage.

The Vicat point of the inventive high-transparency plastic to ISO 306 is high, preferably above 50.0° C., and up to this temperature the plastic therefore retains its exceptional mechanical properties, in particular high impact strength, and its hardness.

The inventive high-transparency plastic can be prepared via free-radical copolymerization in a simple manner, on an industrial scale, at low cost, of a monomer mixture which is preferably flowable at atmospheric pressure and temperatures in the range from 20.0 to 80.0° C.

The underlying monomer mixture can likewise be prepared in a simple manner, on an industrial scale, and at low cost.

The mixtures of the present invention encompass compounds of the formula (I) and/or (II)

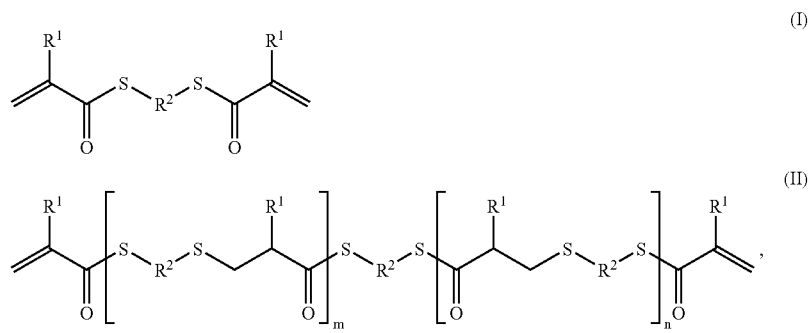

where each $R^1$, independently of the others, is hydrogen or a methyl radical, preferably a methyl radical, and each $R^2$, independently of the others, is a linear or branched, aliphatic or cycloaliphatic radical, or a substituted or unsubstituted aromatic or heteroaromatic radical, where the radical $R^2$ may preferably encompass from 1 to 100, in particular from 1 to 20, carbon atoms.

By way of example, among the preferred linear or branched, aliphatic or cycloaliphatic radicals are the methylene, ethylene, propylene, isopropylene, n-butylene, isobutylene, tert-butylene, or cyclohexylene group.

Among the preferred divalent aromatic or heteroaromatic radicals are in particular groups which derive from benzene, from naphthalene, from biphenyl, from diphenyl ether, from diphenylmethane, from diphenyldimethylmethane, from bisphenone, from diphenyl sulphone, from quinoline, from pyridine, from anthracene, and from phenanthrene. For the purposes of the present invention, cycloaliphatic radicals here also encompass bi-, tri- and polycyclic aliphatic radicals.

The radical $R^2$ also encompasses radicals of the formula

 (Ia), where each $R^3$, independently of the others, is a linear or branched, aliphatic or cycloaliphatic radical, e.g. a methylene, ethylene, propylene, isopropylene, n-butylene, isobutylene, tert-butylene or cyclohexylene group. Each radical X, independently of the others, is oxygen or sulphur, and the radical $R^4$ is a linear or branched, aliphatic or cycloaliphatic radical, e.g. a methylene, ethylene, propylene, isopropylene, n-butylene, isobutylene, tert-butylene or cyclohexylene group. For the purposes of the present invention, cycloaliphatic radicals here also encompass bi-, tri- and polycyclic aliphatic radicals. Y is a whole number from 1 to 10, in particular 1, 2, 3 or 4.

Preferred radicals of the formula (Ia) encompass:

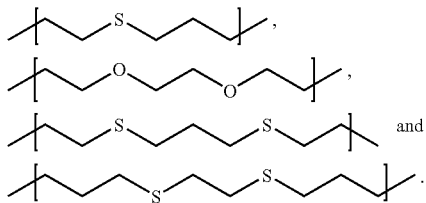

The radical $R^2$ is preferably an aliphatic radical having from 1 to 10 carbon atoms, preferably a linear aliphatic radical having from 2 to 8 carbon atoms.

Each of the indices m and n, independently of the others, is a whole number greater than or equal to 0, such as 0, 1, 2, 3, 4, 5 or 6. The sum m+n here is greater than 0, preferably in the range from 1 to 6, advantageously in the range from 1 to 4, in particular 1, 2 or 3.

Each of the compounds of the formula (I), and also of the compounds of the formula (II), may be used individually or else in the form of a mixture of two or more compounds of the formula (I) and, respectively, (II).

The relative proportions of the compounds of the formula (I) and (II) in the inventive monomer mixture may in principle be as desired, and they can be utilized to "tailor" the property profile of the inventive plastic to the demands of the application. By way of example, it can be extremely advantageous for the monomer mixture to comprise a marked excess of compound(s) of the formula (I) or compound(s) of the formula (II), based in each case on the total amount of compounds of the formula (I) and (II).

However, for the purposes of the present invention it is particularly advantageous for the mixture to comprise more than 10 mol %, preferably more than 12 mol %, in particular more than 14 mol %, based on the total amount of the compounds of the formula (I) and (II), of compounds of the formula (II) where m+n=2.

It is moreover particularly advantageous according to the invention to use mixtures which comprise more than 5.8 mol %, advantageously more than 6.5 mol %, in particular more than 7.5 mol %, based on the total amount of the compounds of the formula (I) and (II), of compounds of the formula (II) where m+n=3. The proportion of the compounds (I) is preferably from 0.1 to 50.0 mol %, advantageously from 10.0 to 45.0 mol %, in particular from 20.0 to 35.0 mol %, based on the total amount of the compounds of the formula (I) and (II). The proportion of the compounds (II) where m+n=1 is preferably greater than 30.0 mol %, advantageously greater than 35.0 mol %, in particular greater than 40 mol %, based on the total amount of the compounds of the formula (I) and (II). The proportion of the compounds (II) where m+n>3 is preferably greater than 0 mol %, advantageously greater than 1 mol %, in particular greater than 2 mol %, based on the total amount of the compounds of the formula (I) and (II).

Processes for preparing the compounds of the formula (I) and (II) are known to the person skilled in the art, for example from DE 4234251, the disclosure of which is expressly incorporated herein by way of reference. However, for the purposes of the present invention, it has proven very particularly advantageous to prepare a mixture of the compounds of the formula (I) and (II) via a process in which from 1.0 to <2.0 mol, preferably from 1.1 to 1.8 mol, advantageously from 1.2 to 1.6 mol, in particular from 1.2 to 1.5 mol, of at least one compound of the formula (III)

 (III)

are reacted with one mole of at least one polythiol of the formula (IV)

 (IV)

The radical X is halogen, in particular chlorine or bromine, or a radical

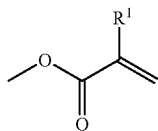

this means that the compounds of the formula (III) encompass, inter alia, acryloyl chloride, methacryloyl chloride, acrylic anhydride and methacrylic anhydride, particular preference being given to the use of acrylic anhydride, methacrylic anhydride or mixtures of the two.

Each M indicates, independently of the other, hydrogen or a metal cation. Preferred metal cations derive from elements whose electronegativity is smaller than 2.0, advantageously smaller than 1.5, particular preference being given to alkali metal cations, in particular $Na^+$, $K^+$, $Rb^+$, $Cs^+$ and alkaline earth metal cations, in particular $Mg^{2+}$, $Ca^{2+}$, $Sr^{2+}$, $Ba^{2+}$. Very particularly advantageous results may be achieved using the metal cations $Na^+$ and $K^+$.

Polythiols of the formula (IV) particularly suitable in this context encompass 1,2-ethanedithiol, 1,2-propanedithiol, 1,3-propanedithiol, 1,2-butanedithiol, 1,3-butanedithiol, 1,4-butanedithiol, 2-methylpropane-1,2-dithiol, 2-methylpropane-1,3-dithiol, 3,6-dioxa-1,8-octanedithiol, ethylcyclohexyl dimercaptans obtainable via reaction of 4-ethenylcyclohexene with hydrogen sulphite, ortho-bis(mercaptomethyl)benzene, meta-bis(mercaptomethyl)benzene, para-bis(mercaptomethyl)benzene, compounds of the formula

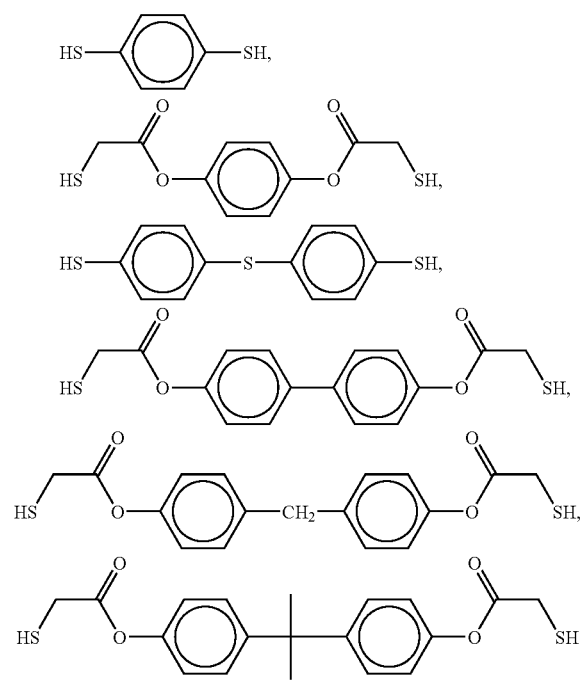

and also compounds of the formula

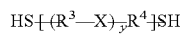 (IVa)

where each $R^3$, independently of the others, is a linear or branched, aliphatic or cycloaliphatic radical, such as a methylene, ethylene, propylene, isopropylene, n-butylene, isobutylene, tert-butylene or cyclohexylene group. For the purposes of the present invention, cycloaliphatic radicals here also encompass bi-, tri- and polycyclic aliphatic radicals. Each radical X, independently of the others, is oxygen or sulphur, and the radical $R^4$ is a linear or branched, aliphatic or cycloaliphatic radical, such as a methylene, ethylene, propylene, isopropylene, n-butylene, isobutylene, tert-butylene or cyclohexylene group. For the purposes of the present invention, cycloaliphatic radicals here also encompass bi-, tri- and polycyclic aliphatic radicals. y is a whole number from 1 to 10, in particular 1, 2, 3 or 4.

Preferred compounds of the formula (IVa) encompass:

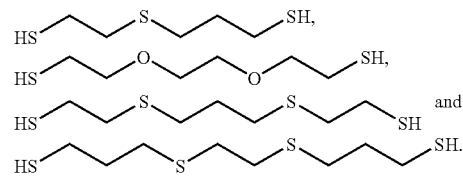

For the purposes of one particularly preferred embodiment of this process, the compound used of the formula (IV) comprises 1,2-ethahedithiol.

This process reacts the compound(s) of the formula (III) in at least one inert, organic solvent S, and the compound(s) of the formula (IV) in aqueous alkaline solution, the expression "inert, organic solvent" applying to organic solvents which do not react with the compounds present in the reaction system under the respective reaction conditions.

It is preferable for at least one solvent S to have a relative dielectric constant >2.6, preferably >3.0, advantageously >4.0, in particular >5.0, in each case measured at 20° C. In this context, the relative dielectric constant indicates a dimensionless value stating the factor by which the capacitance C of a (theoretical) capacitor located within a vacuum increases when substances with dielectric properties, known as dielectrics, are introduced between the plates. This value is measured at 20° C. and extrapolated to low frequencies ($\omega \rightarrow 0$). For further details reference is made to the familiar technical literature, in particular to Ullmann Encyklopädie der technischen Chemie, [Ullmann's Encyclopaedia of Industrial Chemistry] Volume 2/1 Anwendung physikalischer und physikalisch-chemischer Methoden im Laboratorium [Application of physical and physico-chemical methods in the laboratory], headword: Dielektrizitätskonstante [Dielectric constant], pp. 455-479. Dielectric values of solvents are given, inter alia, in Handbook of Chemistry and Physics, 71st edition, CRC Press, Baco Raton, Ann Arbor, Boston, 1990-1991, pp. 8-44, 8-46 and 9-9 to 9-12.

For the purposes of this process it is moreover particularly advantageous for the solvent and the aqueous solution to form two phases during the reaction and not to be capable of homogeneous mixing. To this end, the water solubility value for the solvent, measured at 20° C., is preferably smaller than 10 g of water, based on 100 g of solvent.

Solvents S preferred according to the invention encompass
aliphatic ethers, such as diethyl ether (4.335), dipropyl ether, diisopropyl ether;
cycloaliphatic ethers, such as tetrahydrofuran (7.6);
aliphatic esters, such as methyl formate (8.5), ethyl formate, propyl formate, methyl acetate, ethyl acetate, n-butyl acetate (5.01), methyl propionate, methyl butyrate (5.6), ethyl butyrate, 2-methoxyethyl acetate;
aromatic esters, such as benzyl acetate, dimethyl phthalate, methyl benzoate (6.59), ethyl benzoate (6.02), methyl salicylate, ethyl salicylate, phenyl acetate (5.23);
aliphatic ketones, such as acetone, methyl ethyl ketone (18.5), 2-pentanone (15.4), 3-pentanone (17.0), methyl isoamyl ketone, methyl isobutyl ketone (13.1);
aromatic ketones, such as acetophenone;
nitroaromatics, such as nitrobenzene, o-nitrotoluene (27.4), m-nitrotoluene (23), p-nitrotoluene;
halogenated aromatics, such as chlorobenzene (5.708), o-chlorotoluene (4.45), m-chlorotoluene (5.55), p-chlorotoluene (6.08), o-dichlorobenzene, m-dichlorobenzene;
heteroaromatics, such as pyridine, 2-methylpyridine. (9.8), quinoline, isoquinoline; and mixtures of these compounds, the data in brackets being the respective associated relative dielectric constants at 20° C.

Compounds very particularly suitable here for the purposes of the present invention are aliphatic esters and cycloaliphatic ethers, in particular ethyl acetate and tetrahydrofuran.

For the purposes of the present process, it is possible either to use the solvent S alone or else to use a solvent mixture, in which case it is not necessary that all of the solvents present in the mixture comply with the abovementioned dielectric criterion. By way of example, according to the invention it is also possible to use tetrahydrofuran/cyclohexane mixtures. However, it has proven advantageous for the solvent mixture to have a relative dielectric constant >2.6, preferably >3.0, advantageously >4.0, in particular >5.0, in each case measured at 20° C. Particularly advantageous results can be achieved using solvent mixtures which comprise only solvents whose relative dielectric constant is >2.6, preferably >3.0, advantageously >4.0, in particular >5.0, in each case measured at 20° C.

The aqueous alkaline solution of the compound(s) of the formula (IV) preferably comprises from 1.1 to 1.5 val (equivalents) of at least one Bronsted base, based on the total amount of compound(s) of the formula (III). Preferred Bronsted bases for the purposes of the present invention encompass alkali metal hydroxides and alkaline earth metal hydroxides, in particular sodium hydroxide and potassium hydroxide.

In principle, any conceivable method may be used for the conduct of the reaction. By way of example, the compound(s) of the formula (III) may form an initial charge in the solvent (mixture) S, and the aqueous alkaline solution of the compound(s) of the formula (IV) may be added stepwise or continuously. However, for the purposes of the present invention it has proven very particularly advantageous to meter the compound(s) of the formula (III) in at least one inert, organic solvent S and the compound(s) of the formula (IV) in aqueous alkaline solution to the reaction vessel in parallel.

The reaction temperature may be varied widely, but the temperature is often in the range from 20.0 to 120.0° C., preferably in the range from 20.0 to 80.0° C. Similar considerations apply for the pressure at which the reaction is completed. The reaction may therefore take place either at subatmospheric pressure or else at superatmospheric pressure. However, it is preferably carried out at atmospheric pressure. Although the reaction can also take place in air, it has proven very particularly advantageous for the purposes of the present invention to carry out the reaction under an inert gas, preferably nitrogen and/or argon, preferably with a very small proportion of oxygen present.

The reaction mixture is advantageously reacted in a further step with a Bronsted acid, preferably until the pH of the aqueous solution at 20° C. is below 7.0, advantageously below 6.0, in particular below 5.0. Acids which may be used in this context encompass inorganic mineral acids, such as hydrochloric acid, sulphuric acid, phosphoric acid, organic acids, such as acetic acid, propionic acid, and acidic ion exchangers, in particular acidic synthetic resin ion exchangers, e.g. ®Dowex M-31 (H). The method which has proven very particularly successful here is the use of acidic synthetic resin ion exchangers loaded with at least 1.0 meq, preferably at least 2.0 meq, in particular at least 4.0 meq, of H$^+$ ions, based on 1 g of dry ion exchanger, grain sizes of from 10 to 50 mesh and porosities in the range from 10 to 50%, based on the total volume of the ion exchanger.

In an advantageous method for isolating the compounds of the formula (I) and (II) the organic phase composed of the solvent S is separated off and, where appropriate, washed, and dried, and the solvent is evaporated.

During the reaction of the compound(s) of the formula (III) with the compound(s) of the formula (IV) it is possible to add inhibitors which inhibit free-radical polymerization of the (meth)acrylic groups during the reaction. These inhibitors are well-known to persons skilled in the art.

Use is mainly made of 1,4-dihydroxybenzenes. However, it is also possible to use dihydroxybenzenes having other substitution. These inhibitors can generally be represented by the general formula (V)

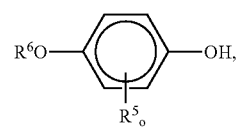

where
R$^5$ is a linear or branched alkyl radical having from one to eight carbon atoms, halogen or aryl, preferably an alkyl radical having from one to four carbon atoms, particularly preferably methyl, ethyl, n-propyl, isopropyl, n-butyl, isobutyl, sec-butyl, tert-butyl, Cl, F or Br;

o is a whole number in the range from one to four, preferably one or two; and

R$^6$ is hydrogen, a linear or branched alkyl radical having from one to eight carbon atoms, or aryl, preferably an alkyl radical having from one to four carbon atoms, particularly preferably methyl, ethyl, n-propyl, isopropyl, n-butyl, isobutyl, sec-butyl or tert-butyl.

However, it is also possible to use compounds whose parent compound is 1,4-benzoquinone. These may be described by the formula (VI)

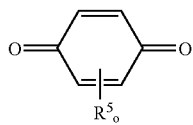

(VI)

where $R^5$ is a linear or branched alkyl radical having from one to eight carbon atoms, halogen or aryl, preferably an alkyl radical having from one to four carbon atoms, particularly preferably methyl, ethyl, n-propyl, isopropyl, n-butyl, isobutyl, sec-butyl, tert-butyl, Cl, F or Br; and o is a whole number in the range from one to four, preferably one or two.

Use is also made of phenols of the general structure (VII)

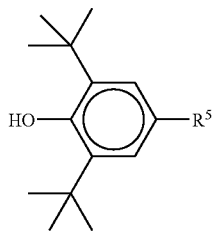

(VII)

where $R^5$ is a linear or branched alkyl radical having from one to eight carbon atoms, aryl or aralkyl, propionic esters with mono- to tetrahydric alcohols, which may also contain heteroatoms, such as S, O and N, preferably an alkyl radical having from 1 to 4 carbon atoms, particularly preferably methyl, ethyl, n-propyl, isopropyl, n-butyl, isobutyl, sec-butyl, tert-butyl.

Another advantageous class of substance is represented by hindered phenols based on triazine derivatives of the formula (VIII)

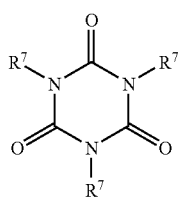

(VIII)

where $R^7$=a grouping of the formula (IX)

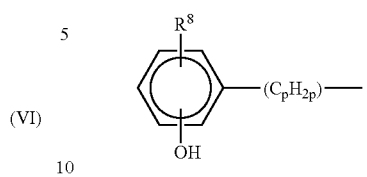

(IX)

where

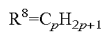

$R^8 = C_pH_{2p+1}$ where p=1 or 2.

Compounds used with particular success are 1,4-dihydroxybenzene, 4-methoxyphenol, 2,5-dichloro-3,6-dihydroxy-1,4-benzoquinone, 1,3,5-trimethyl-2,4,6-tris-(3,5-di-tert-butyl-4-hydroxybenzyl)benzene, 2,6-di-tert-butyl-4-methylphenol, 2,4-dimethyl-6-tert-butyl-phenol, 2,2-bis[3,5-bis(1,1-dimethylethyl)-4-hydroxyphenyl-1-oxopropoxymethyl)]1,3-propanediyl ester, 2,2'-thiodiethyl bis[3-(3,5-di-tert-butyl-4-hydroxyphenyl)propionate], octadecyl 3-(3,5-di-tert-butyl-4-hydroxyphenyl)propionate, 3,5-bis(1,1-dimethylethyl-2,2'-methylenebis(4-methyl-6-tert-butyl)phenol, tris-(4-tert-butyl-3-hydroxy-2,6-dimethylbenzyl)-s-triazine-2,4,6-(1H,3H,5H)trione, tris(3,5-di-tert-butyl-4-hydroxy)-s-triazine-2,4,6-(1H,3H,5H)trione or tert-butyl-3,5-dihydroxybenzene.

Based on the weight of the entire reaction mixture, the proportion of the inhibitors individually or in the form of a mixture is generally from 0.01 to 0.50% (by weight), the concentration of the inhibitors preferably being selected in such a way as not to impair the DIN 55945 colour number. Many of these inhibitors are commercially available.

For the purposes of the present invention, the mixture also comprises, alongside the compounds of the formula (I) and (II), at least one monomer (A) capable of free-radical polymerization and having at least two terminal olefinic groups. Terminal means that at least three of the four radicals linked to the two carbon atoms of the double bond have not more than one carbon atom. The olefinic group preferably has at least two hydrogen and/or fluorine atoms. The fourth radical links the at least two olefinic groups to one another. At least two of the olefinic groups differ, the olefinic groups of the monomer (A) having, in the α- and/or β-position with respect to the olefinic group, atoms which differ in nature and/or number, in the radical which connects the at least two olefinic groups. The atom in the α-position with respect to the olefinic group has bonding by way of a covalent bond to a carbon atom of the double bond. The atoms in the β-position have bonding by way of two covalent bonds to a carbon atom of the double bond.

Among the preferred olefinic groups are the allyl group, the acryloyl group and the methacryloyl group. An allyl group has, by way of example, a carbon atom in the α-position with respect to the double bond, and has two hydrogen atoms in the β-position. A(n) (meth)acryloyl group, by way of example, has a carbon atom in the α-position with respect to the double bond, and has two oxygen atoms in the β-position.

The molar mass of the monomers (A) capable of free-radical polymerization is at least 150 g/mol, preferably at least 250 g/mol and particularly preferably at least 500 g/mol.

There are at least 5, in particular at least 10, and particularly preferably at least 15 bonds separating the most adjacent carbon atoms of the at least two olefinic groups from one another.

The different substituents at the respective double bonds preferably give different polymerization rates. By way of example, the polymerization rate of the differently substituted double bonds may be determined by way of their space-time yield. Further details in this connection are described in Ullmann, 3rd edition, Volume 14, pp. 131 et seq.

Surprisingly, the addition of monomer (A) improves the mechanical properties of the inventive plastics material without adversely affecting its optical properties. In many instances, a favourable effect on optical properties is found.

According to one particular aspect of the present invention, the compounds termed monomer (A) are preferably molecules having a linear structure and varying chain lengths of the general formula (X)

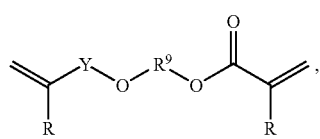
(X)

where the radical R is independently a hydrogen atom, a fluorine atom and/or a methyl group, the radical $R^9$ is a connecting group, preferably encompassing from 1 to 1000, in particular from 2 to 100, carbon atoms and the radical Y is a bond or a connecting group having from 0 to 1000 carbon atoms, in particular from 1 to 1000 carbon atoms, and preferably from 1 to 100 carbon atoms. The length of the molecule can be varied by way of the molecular component $R^9$. Compounds of the formula (X) have, at one end of the molecule, a terminal (meth)acrylate function, and at the other end have a terminal group other than a methacrylate function. Among the preferred groups Y are in particular a bond (vinyl group), a $CH_2$ group (allyl group), and also aliphatic or aromatic groups having from 1 to 20 carbon atoms, for example a benzene-derived group, the aliphatic or aromatic groups particularly preferably containing a urethane group.

The radical $R^9$ is preferably a linear or branched, aliphatic or cycloaliphatic radical, such as a methylene, ethylene, propylene, isopropylene, n-butylene, isobutylene, tert-butylene or cyclohexylene group, or a radical of the general formula

(Xa), where the radical $R^{11}$ is a linear or branched, aliphatic or cycloaliphatic radical, or a substituted or unsubstituted aromatic or heteroaromatic radical, e.g. a methylene, ethylene, propylene, isopropylene, n-butylene, isobutylene, tert-butylene or cyclohexylene group, or divalent aromatic or heteroaromatic groups which derive from benzene, from naphthalene, from biphenyl, from diphenyl ether, from diphenylmethane, from diphenyldimethylmethane, from bisphenone, from diphenyl sulphone, from quinoline, from pyridine, from anthracene, or from phenanthrene. For the purposes of the present invention, cycloaliphatic radicals here also encompass bi-, tri- and polycyclic aliphatic radicals. Each radical $R^{10}$, independently of the others, is a linear or branched, aliphatic or cycloaliphatic radical or a substituted or unsubstituted aromatic or heteroaromatic radical, e.g. a methylene, ethylene, propylene, isopropylene, n-butylene, isobutylene, tert-butylene or cyclohexylene group, or divalent aromatic or heteroaromatic groups which derive from benzene, from naphthalene, from biphenyl, from diphenyl ether, from diphenylmethane, from diphenyldimethylmethane, from bisphenone, from diphenyl sulphone, from quinoline, from pyridine, from anthracene, or from phenanthrene. For the purposes of the present invention, cycloaliphatic radicals here also encompass bi-, tri- and polycyclic aliphatic radicals. Each radical $X^I$, independently of the others, is oxygen, sulphur, an ester group of the general formula (Xb), (Xc),

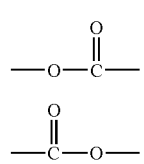
(Xb)

(Xc)

a urethane group of the general formula (Xd), (Xe), (Xf) or (Xg),

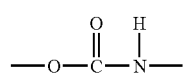
(Xd)

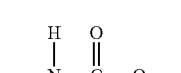
(Xe)

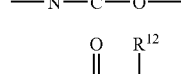
(Xf)

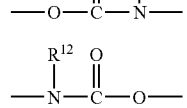
(Xg)

a thiourethane group of the general formula (Xh), (Xi), (Xj) or (Xk),

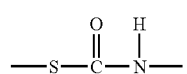
(Xh)

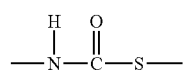
(Xi)

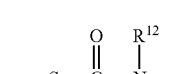
(Xj)

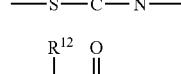
(Xk)

a dithiourethane group of the general formula (Xl), (Xm), (Xn) or (Xo)

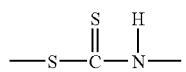
(Xl)

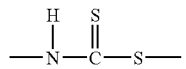
(Xm)

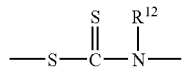
(Xn)

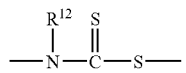
(Xo)

a thiocarbamate group of the general formula (Xp), (Xq) (Xr) or (Xs)

(Xp)

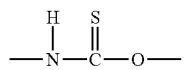
(Xq)

(Xr)

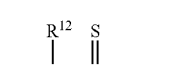
(Xs)

preferably oxygen, where the radical $R^{12}$ is a linear or branched, aliphatic or cycloaliphatic radical or a substituted or unsubstituted aromatic or heteroaromatic radical, e.g. a methyl, ethyl, propyl, isopropyl, n-butyl, isobutyl, tert-butyl or cyclohexyl group, or monovalent aromatic or heteroaromatic groups derived from benzene, from naphthalene, from biphenyl, from diphenyl ether, from diphenylmethane, from diphenyldimethylmethane, from bisphenone, from diphenyl sulphone, from quinoline, from pyridine, from anthracene, or from phenanthrene. For the purposes of the present invention, cycloaliphatic radicals here also encompass bi-, tri- and polycyclic aliphatic radicals. z is a whole number from 1 to 1000, advantageously from 1 to 100, in particular from 1 to 25.

In one particular embodiment of the formula (X) the compounds comprise those of the formula (XI)

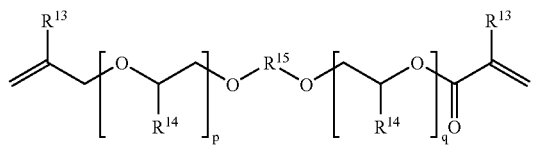
(XI)

and/or of the formula (XII),

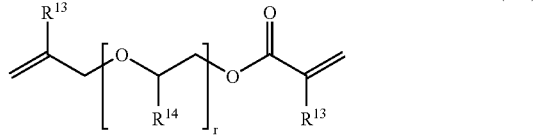
(XII)

where each of the radicals $R^{13}$ and $R^{14}$, independently of the other, is hydrogen or a methyl radical, and the radical $R^{15}$ is a linear or branched, aliphatic or cycloaliphatic divalent radical, or a substituted or unsubstituted aromatic or heteroaromatic divalent radical. Preferred radicals have been described above.

The length of the chain may be influenced via variation of the number of polyalkylene oxide units, preferably polyethylene glycol units. Compounds of the formula (XI) and (XII) which have proven particularly suitable for the method described here of achieving the object have numbers of polyoxyalkylene oxide units r, p and q which are, independently of the others, from 1 to 40, preferably from 5 to 20, in particular from 7 to 15 and particularly preferably from 8 to 12.

Monomers (A) which are very particularly preferred according to the invention encompass compounds of the formula (XI), in particular

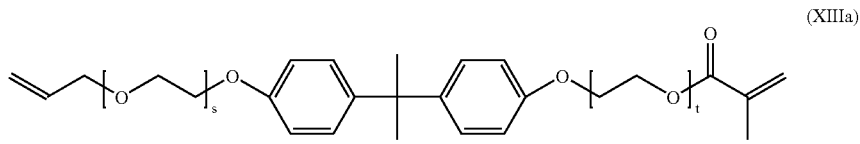
(XIIIa)

where s and t are greater than or equal to zero and the sum s+t is preferably in the range from 1 to 20, in particular in the range from 2 to 10, and compounds of the formula (XII), in particular

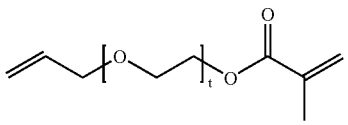

(XIIIb)

where s and t are gearter than or equal to zero and the sum s+t is preferably in the range from 1 to 20, in particular in the range from 2 to 10.

According to one particular aspect, the mixture preferably comprises from 1 to 40% by weight, in particular from 5 to 35% by weight, of compounds of the formula (XI) and/or (XII), based on the total weight of the monomer mixture.

For the purposes of one particularly preferred embodiment of the present invention, the inventive mixture also comprises at least one ethylenically unsaturated monomer (B). These monomers (B) differ from the asymmetric monomers (A) and the thio(meth)acrylates of the formulae (I) and/or (II). The monomers (B) are known to persons skilled in the art and are preferably copolymerizable with the monomers (A) and the thio(meth)acrylates of the formulae (I) and/or (II). Among these monomers (B) are in particular nitriles of (meth)acrylic acid and other nitrogen-containing methacrylates, such as methacryloylamidoacetonitrile, 2-methacryloyloxyethylmethylcyanamide, cyanomethyl methacrylate;

(meth)acrylates which derive from saturated alcohols, e.g. methyl(meth)acrylate, ethyl(meth)acrylate, n-propyl (meth)acrylate, isopropyl(meth)acrylate, n-butyl(meth) acrylate, sec-butyl(meth)acrylate, tert-butyl(meth)acrylate, pentyl(meth)acrylate, hexyl(meth)acrylate, heptyl (meth)acrylate, 2-ethylhexyl(meth)acrylate, octyl(meth) acrylate, nonyl(meth)acrylate, isooctyl(meth)acrylate, isononyl(meth)acrylate, 2-tert-butylheptyl(meth)acrylate, 3-iospropylheptyl(meth)acrylate, decyl(meth)acrylate, undecyl(meth)acrylate, 5-methylundecyl(meth)acrylate, dodecyl(meth)acrylate, 2-methyldodecyl(meth)acrylate, tridecyl(meth)acrylate, 5-methyltridecyl(meth)acrylate, tetradecyl(meth)acrylate, pentadecyl(meth)acrylate, hexadecyl(meth)acrylate, 2-methylhexadecyl(meth)acrylate, heptadecyl(meth)acrylate, 5-isopropyl-heptadecyl(meth) acrylate, 4-tert-butyloctadecyl(meth)acrylate, 5-ethyloctadecyl(meth)acrylate, 3-isopropyloctadecyl(meth)acrylate, octadecyl(meth)acrylate, nonadecyl(meth)acrylate, eicosyl(meth)acrylate, cetyleicosyl(meth)acrylate, stearyleicosyl(meth)acrylate, docosyl(meth)acrylate and/or eicosyltetratriacontyl(meth)acrylate;

cycloalkyl(meth)acrylate, such as cyclopentyl(meth)acrylate, cyclohexyl(meth)acrylate, 3-vinyl-2-butylcyclohexyl (meth)acrylate and bornyl(meth)acrylate;

(meth)acrylates which derive from unsaturated alcohols e.g. 2-propynyl(meth)acrylate, allyl(meth)acrylate, and oleyl (meth)acrylate, vinyl(meth)acrylate;

aryl(meth)acrylates, such as benzyl(meth)acrylate or phenyl (meth)acrylate, where each of the aryl radicals may be unsubstituted or have up to four substituents;

hydroxyalkyl(meth)acrylates, such as 3-hydroxypropyl (meth)acrylate, 3,4-dihydroxybutyl(meth)acrylate, 2-hydroxyethyl(meth)acrylate, 2-hydroxypropyl(meth)acrylate, 2,5-dimethyl-1,6-hexanediol(meth)acrylate, 1,10-decanediol(meth)acrylate, 1,2-propanediol(meth) acrylate;

polyoxyethylene-based and polyoxypropylene-based derivatives of (meth)acrylic acid, e.g. triethylene glycol(meth) acrylate, tetraethylene glycol(meth)acrylate, tetrapropylene glycol(meth)acrylate;

di(meth)acrylates, such as 1,2-ethanediol di(meth)acrylate, 1,4-butanediol di(meth)acrylate, diethylene glycol di(meth)acrylate, dipropylene glycol di(meth)acrylate, triethylene glycol di(meth)acrylate, tri-propylene glycol di(meth)acrylate, tetraethylene glycol di(meth)acrylate, tetrapropylene glycol di(meth)acrylate, polyethylene glycol di(meth)acrylate (preferably with weight-average molar masses in the range from 200 to 5 000 000 g/mol, advantageously in the range from 200 to 25 000 g/mol, in particular in the range from 200 to 1 000 g/mol), polypropylene glycol di(meth)acrylate (preferably with weight-average molar masses in the range from 200 to 5 000 000 g/mol, advantageously in the range from 250 to 4 000 g/mol, in particular in the range from 250 to 1 000 g/mol), 2,2'-thiodiethanol di(meth)acrylate (thiodiglycol di(meth)acrylate), 3,9-di(meth)acryloyloxymethyltricyclo [5.2.1.0(2.6)]decane, in particular

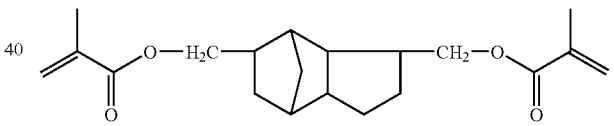

3,8-di(meth)acryloyloxymethyltricyclo[5.2.1.0(2.6)]-decane, 4,8-di(meth)acryloyloxymethyltricyclo[5.2.1.0(2.6)]-decane, 4,9-di(meth)acryloyloxymethyltricyclo[5.2.1.0 (2.6)]-decane, ethoxylated bisphenol A di(meth)acrylate, in particular

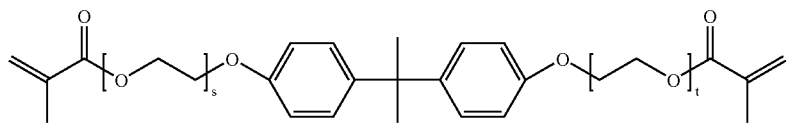

where s and t are greater than or equal to zero and the sum s+t is preferably in the range from 1 to 20, in particular in the range from 2 to 10, and di(meth)acrylates obtainable via reaction of diisocyanates with 2 equivalents of hydroxyalkyl (meth)acrylate, in particular

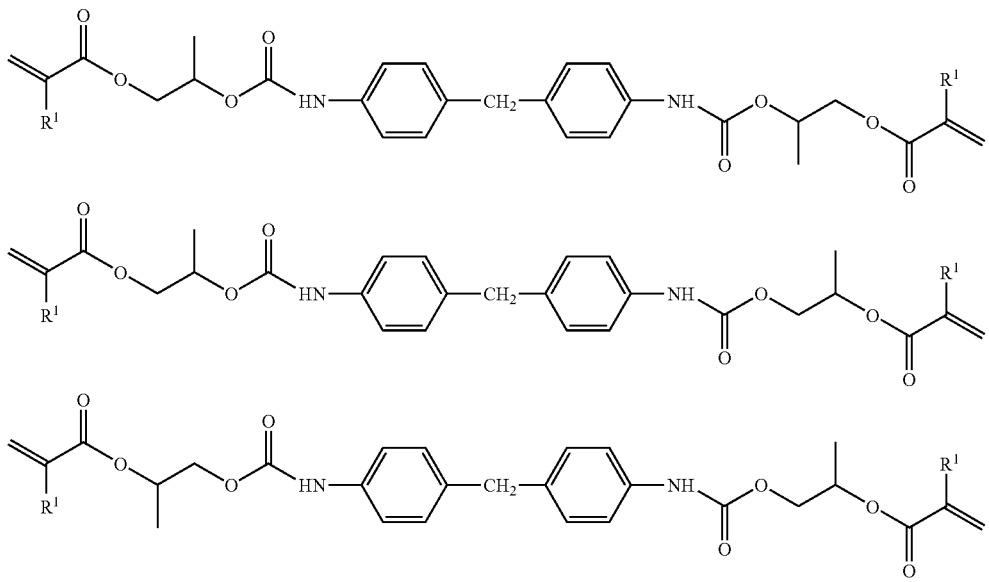

where each radical $R^1$, independently of the other, is hydrogen or a methyl radical, aminoalkyl(meth)acrylates, such as tris(2-methacryloxyethyl)amine, N-methylformamidoethyl(meth)acrylate, 2-ureidoethyl(meth)acrylate;

carbonyl-containing (meth)acrylates, such as 2-carboxyethyl (meth)acrylate, carboxymethyl(meth)acrylate, oxazolidinylethyl(meth)acrylate, N-(methacryloyloxy)formamide, acetonyl(meth)acrylate, N-methacryloylmorpholine, N-methacryloyl-2-pyrrolidinone;

(meth)acrylates of ether alcohols, e.g. tetrahydrofurfuryl (meth)acrylate, vinyloxyethoxyethyl(meth)acrylate, methoxyethoxyethyl(meth)acrylate, 1-butoxypropyl (meth)acrylate, 1-methyl-(2-vinyloxy)ethyl(meth)acrylate, cyclohexyloxymethyl(meth)acrylate, methoxymethoxyethyl(meth)acrylate, benzyloxymethyl(meth)acrylate, furfuryl(meth)acrylate, 2-butoxyethyl(meth)acrylate, 2-ethoxyethoxymethyl(meth)acrylate, 2-ethoxyethyl(meth)acrylate, allyloxymethyl(meth)acrylate, 1-ethoxybutyl(meth)acrylate, methoxymethyl(meth)acrylate, 1-ethoxyethyl(meth)acrylate, ethoxymethyl(meth)acrylate;

(meth)acrylates of halogenated alcohols such as 2,3-dibromopropyl(meth)acrylate, 4-bromophenyl(meth)acrylate, 1,3-dichloro-2-propyl(meth)acrylate, 2-bromoethyl (meth)acrylate, 2-iodoethyl(meth)acrylate, chloromethyl (meth)acrylate;

oxiranyl(meth)acrylates, such as 2,3-epoxybutyl(meth)acrylate, 3,4-epoxybutyl(meth)acrylate, glycidyl(meth)acrylate;

amides of (meth)acrylic acid, e.g. N-(3-dimethylaminopropyl)(meth)acrylamide, N-(diethylphosphono)(meth)acrylamide, 1-(meth)acryloylamido-2-methyl-2-propanol, N-(3-dibutylaminopropyl)(meth)acrylamide, N-tert-butyl-N-(diethylphosphono)(meth)acrylamide, N,N-bis(2-diethylaminoethyl)(meth)acrylamide, 4-(meth)acryloylamido-4-methyl-2-pentanol, N-(methoxymethyl)(meth)acrylamide, N-(2-hydroxyethyl)(meth)acrylamide, N-acetyl(meth)acrylamide, N-(dimethylaminoethyl)(meth)acrylamide, N-methyl-N-phenyl(meth)acrylamide, N,N-diethyl(meth)acrylamide, N-methyl(meth)acrylamide, N,N-dimethyl(meth)acrylamide, N-isopropyl(meth) acrylamide;

heterocyclic(meth)acrylates, such as 2-(1-imidazolyl)ethyl (meth)acrylate, 2-(4-morpholinyl)ethyl(meth)acrylate and 1-(2-methacryloyloxyethyl)-2-pyrrolidone;

phosphorus-, boron- and/or silicon-containing (meth)acrylates, such as 2-(dimethylphosphato)propyl(meth)acrylate, 2-(ethylenephosphito)propyl(meth)acrylate, dimethylphosphinomethyl(meth)acrylate, dimethylphosphonoethyl(meth)acrylate, diethyl(meth) acryloylphosphonate, dipropyl(meth)acryloyl phosphate;

sulphur-containing (meth)acrylates, such as ethylsulphinylethyl(meth)acrylate, 4-thiocyanatobutyl(meth)acrylate, ethylsulphonylethyl(meth)acrylate, thiocyanatomethyl (meth)acrylate, methylsulphinylmethyl(meth)acrylate, bis ((meth)acryloyloxyethyl)sulphide;

tri(meth)acrylates, such as trimethylolpropane tri(meth)acrylate, and glycerol tri(meth)acrylate;

bis(allyl carbonates), such as ethylene glycol bis(allyl carbonate), 1,4-butanediol bis(allyl carbonate), diethylene glycol bis(allyl carbonate);

vinyl halides, such as vinyl chloride, vinyl fluoride, vinylidene chloride and vinylidene fluoride;

vinyl esters, such as vinyl acetate;

aromatic vinyl compounds, such as styrene, substituted styrenes having an alkyl substituent in the side chain, e.g. α-methylstyrene and α-ethylstyrene, substituted styrenes having an alkyl substituent on the ring, e.g. vinyltoluene and p-methylstyrene, halogenated styrenes, such as monochlorostyrenes, dichlorostyrenes, tribromostyrenes and tetrabromostyrenes;

heterocyclic vinyl compounds, such as 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylimidazole, N-vinylpyrrolidone, 2-vinylpyrrolidone, N-vinylpyrrolidine, 3-vinylpyrrolidine, N-vinylcaprolactam, N-vinylbutyrolactam, vinyloxolane, vinylfuran, vinylthiophene, vinylthiolane, vinylthiazoles and hydrogenated vinylthiazoles, vinyloxazoles and hydrogenated vinyloxazoles;

vinyl ethers and isoprenyl ethers;

maleic acid and maleic acid derivatives, such as mono- and diesters of maleic acid, the alcohol radicals having from 1 to 9 carbon atoms, maleic anhydride, methylmaleic anhydride, maleimide, methylmaleimide;

fumaric acid and fumaric acid derivatives, such as mono- and diesters of fumaric acid, the alcohol radicals having from 1 to 9 carbon atoms;

and also dienes, such as 1,2-divinylbenzene, 1,3-divinylbenzene, 1,4-divinylbenzene, 1,2-diisopropenylbenzene, 1,3-diisopropenylbenzene and 1,4-diisopropenylbenzene.

In this context, the term (meth)acrylates encompasses methacrylates and acrylates and also mixtures of the two. Correspondingly, the term (meth)acrylic acid encompasses methacrylic acid and acrylic acid and also mixtures of the two.

The ethylenically unsaturated monomers may be used individually or in the form of a mixture.

Monomers (B) which have proven particularly successful are di(meth)acrylates of the formula (XIV)

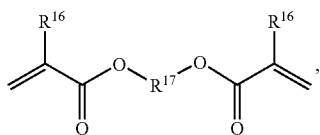

(XIV)

and styrenes. Each $R^{16}$ here, independently of the other, is hydrogen or methyl. $R^{17}$ is a linear or branched alkyl or cycloalkyl radical or an aromatic radical preferably having from 1 to 100, with preference from 1 to 40, preferably from 1 to 20, advantageously from 1 to 8, in particular from 1 to 6, carbon atoms, e.g. a methyl, ethyl, propyl, isopropyl, n-butyl, isobutyl, tert-butyl, cyclopentyl, cyclohexyl or phenyl group. For the purposes of the present invention, cycloaliphatic radicals here also encompass bi-, tri- and polycyclic aliphatic radicals. Very particularly preferred $R^{17}$ are linear or branched alkyl or cycloalkyl radicals having from 1 to 6 carbon atoms.

The radical $R^{17}$ is preferably a linear or branched, aliphatic or cycloaliphatic radical, such as a methylene, ethylene, propylene, isopropylene, n-butylene, isobutylene, tert-butylene or cyclohexylene group, or a radical of the general formula

 (XIVa)

where the radical $R^{11}$ is a linear or branched, aliphatic or cycloaliphatic radical or a substituted or unsubstituted aromatic or heteroaromatic radical, e.g. a methylene, ethylene, propylene, isopropylene, n-butylene, isobutylene, tert-butylene or cyclohexylene group, or divalent aromatic or heteroaromatic groups which derive from benzene, from naphthalene, from biphenyl, from diphenyl ether, from diphenylmethane, from diphenyldimethylmethane, from bispheonone, from diphenyl sulphone, from quinoline, from pyridine, from anthracene or from phenanthrene. For the purposes of the present invention., cycloaliphatic radicals here also encompass bi-, tri- and polycyclic aliphatic radicals.

Each radical $R^{10}$ here, independently of the others, is a linear or branched, aliphatic or cycloaliphatic radical or a substituted or unsubstituted aromatic or heteroaromatic radical, e.g. a methylene, ethylene, propylene, isopropylene, n-butylene, isobutylene, tert-butylene or cyclohexylene group, or divalent aromatic or heteroaromatic groups which derive from benzene, from naphthalene, from biphenyl, from diphenyl ether, from diphenylmethane, from diphenyldimethylmethane, from bisphenone, from diphenyl sulphone, from quinoline, from pyridine, from anthracene or from phenanthrene. For the purposes of the present invention, cycloaliphatic radicals here also encompass bi-, tri- and polycyclic aliphatic radicals.

Each radical $X^1$, independently of the others, is oxygen, sulphur, an ester group of the general formula (XIVb), (XIVc),

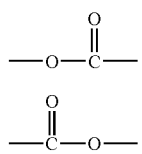

(XIVb)

(XIVc)

a urethane group of the general formula (XIVd), (XIVe), (XIVf) or (XIVg),

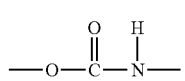

(XIVd)

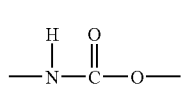

(XIVe)

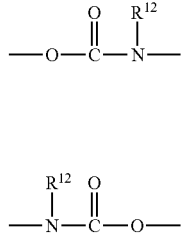

(XIVf)

(XIVg)

a thiourethane group of the general formula (XIVh),

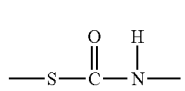

(XIVh)

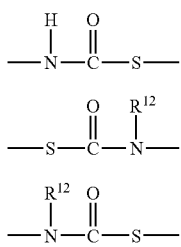 (XIVi)

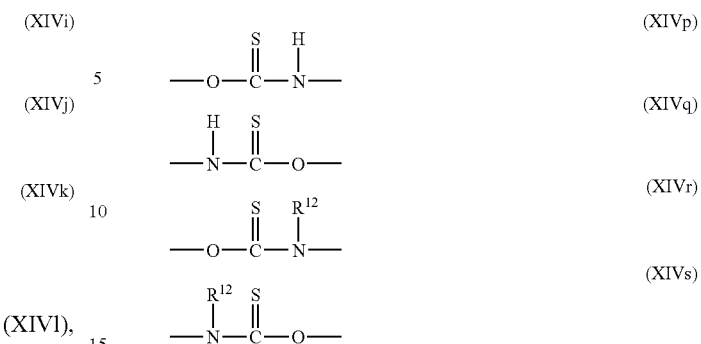

a dithiourethane group of the general formula (XIVl), (XIVm), (XIVn) or (XIVo)

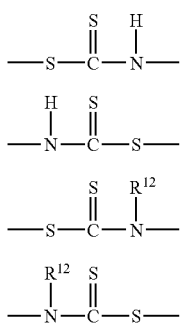

a thiocarbamate group of the general formula (XIVp), (XIVq), (XIVr) or (XIVs)

preferably oxygen, where the radical $R^{12}$ is a linear or branched, aliphatic or cycloaliphatic radical or a substituted or unsubstituted aromatic or heteroaromatic radical, e.g. a methyl, ethyl, propyl, isopropyl, n-butyl, isobutyl, tert-butyl or cyclohexyl group, or monovalent aromatic or heteroaromatic groups derived from benzene, from naphthalene, from biphenyl, from diphenyl ether, from diphenylmethane, from diphenyldimethylmethane, from bisphenone, from diphenyl sulphone, from quinoline, from pyridine, from anthracene, or from phenanthrene. For the purposes of the present invention, cycloaliphatic radicals here also encompass bi-, tri- and polycyclic aliphatic radicals. z is a whole number from 1 to 1000, advantageously from 1 to 100, in particular from 1 to 25.

Particularly preferred di(meth)acrylates of the formula (XIV) encompass ethylene glycol di(meth)acrylate, ethoxylated bisphenol A di(meth)acrylate, in particular

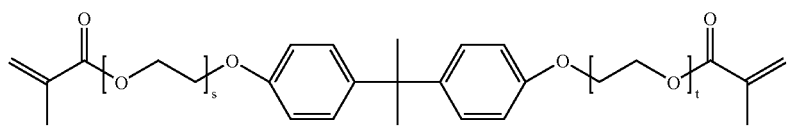

where s and t are greater than or equal to zero and the sum s+t is preferably in the range from 1 to 20, in particular in the range from 2 to 10, and di(meth)acrylates obtainable via reaction of diisocyanates with 2 equivalents of hydroxyalkyl (meth)acrylate, in particular

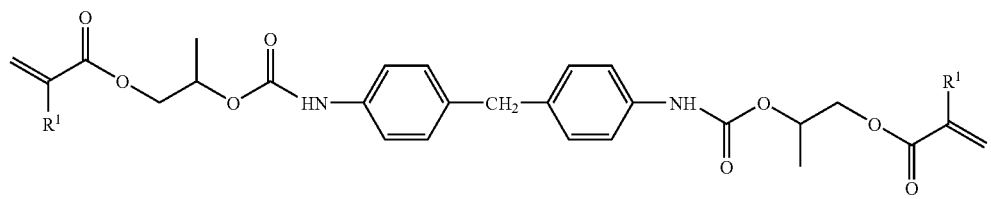

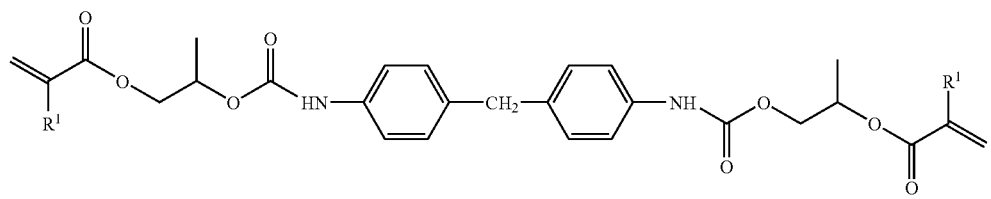

-continued

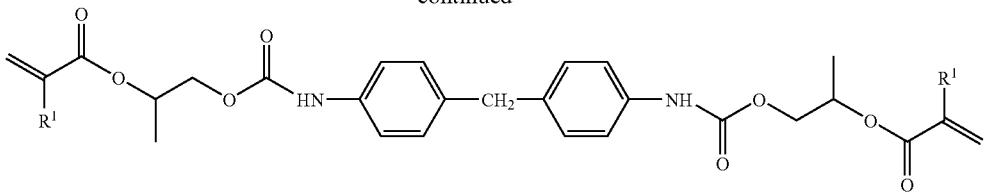

where each radical R¹, independently of the others, is hydrogen or a methyl radical, 3,8-di(meth)acryloyloxymethyltricyclo[5.2.1.0(2.6)]decane, 3,9-di(meth)acryloyloxymethyltricyclo[5.2.1.0(2.6)]decane, 4,8-di(meth)acryloyloxymethyltricyclo[5.2.1.0(2.6)]decane, 4,9-di(meth)acryloyloxymethyltricyclo[5.2.1.0(2.6)]decane, thoidiglycol di(meth)acrylate, polypropylene glycol di(meth)acrylate, preferably with a weight-average molar mass in the range from 200 to 1000 g/mol, and/or polyethylene glycol di(meth)acrylate, preferably with a weight-average molar mass in the range from 200 to 1000 g/mol. Among the compounds mentioned, particular preference is given here to the dimethacrylates. Very particularly advantageous results are obtained using polyethylene glycol dimethacrylate, preferably with a weight-average molar mass in the range from 200 to 1000 g/mol.

In particularly preferred embodiments of the inventive mixtures, at least 70.0 percent by weight of the ethylenically unsaturated monomers (B), particularly preferably more than 80.0% by weight, and advantageously 90.0% by weight, in particular 95.0% by weight, of the ethylenically unsaturated monomers, based on the total weight of the ethylenically unsaturated monomers (B), are di(meth)acrylates of the formula (XIV) and/or styrene.

In principle, the composition of the inventive monomer mixtures may be as desired. It can be utilized to match the property profile of the inventive plastic to the demands of the application. For example, it can be extremely advantageous for the monomer mixture to have a marked excess of compounds of the formula (I) and (II) or of monomer (A). An example of this type of mixture would be a mixture comprising 99.5 mol % of compounds of the formula (I) and (II) or, respectively, monomer (A), and 0.5 mol % of monomer (A) or, respectively, compounds of the formula (I) and (II) based in each case on the total molar amount of the compounds of the formula (I) and (II), and also monomer (A), in the mixture. Almost equimolar mixtures of the compounds of the formula (I) and (II), and also of the monomer (A), are also possible.

However, it has proven to be highly advantageous to select the composition of the monomer mixture in such a way that the compound(s) of the formula (I) and (II) and the at least one monomer (A) mix homogeneously at the desired polymerization temperature, because mixtures of this type are easy to handle due to their generally low viscosity and, furthermore, can be polymerized to give homogeneous plastics with better properties.

According to one particularly preferred embodiment of the present invention, the monomer mixture comprises at least 5.0% by weight, preferably at least 20.0% by weight, particularly preferably at least 50.0% by weight, advantageously at least 60.0% by weight, in particular at least 80.0% by weight, of compounds of the formula (I) and (II), based in each case on the total weight of the monomer mixture. The proportion by weight of the monomer (A) is preferably at least 2.0% by weight, preferably at least 20.0% by weight, particularly preferably at least 40.0% by weight, advantageously at least 50.0% by weight, in particular at least 80.0% by weight, based in each case on the total weight of the monomer mixture.

According to one particular aspect of the present invention, the mixture comprises
from 50 to 90% by weight, in particular from 60 to 85% by weight, of monomers of the formulae (I) and/or (II),
from 2 to 50% by weight, in particular from 10 to 30% by weight, of monomers (A), and
from 0 to 45% by weight, in particular from 10 to 30% by weight, of monomers (B), based in each case on the total weight of the monomer mixture.

The preparation of the monomer mixture to be used according to the invention is obvious to the person skilled in the art. By way of example, it can take place via mixing of the monomers (A) and also of the thio(meth)acrylates of the formulae (I) and/or (II) in a manner known per se.

For the purposes of the present invention, the monomer mixture is preferably flowable at atmospheric pressure and temperatures in the range from 20.0 to 80.0° C. The term "flowable" is known to the person skilled in the art. It characterizes a liquid which can preferably be cast into various shapes and, using suitable aids, stirred and homogenized. For the purposes of the invention, particular flowable materials have, in particular at 25° C. and at atmospheric pressure (101325 Pa) dynamic viscosities of the order of from 0.1 mPa·s to 10 Pa·s, advantageously in the range from 0.65 mPa·s to 1 Pa.s. In one particularly preferred embodiment of the present invention, a cast monomer mixture has no bubbles, in particular no air bubbles. Preference is likewise given to monomer mixtures from which bubbles, in particular air bubbles, can be removed via suitable processes, such as temperature increase and/or application of vacuum.

The inventive high-transparency plastic is obtainable via free-radical copolymerization of the low-viscosity (η<200 mPa·s) monomer mixture described above. Free-radical copolymerization is a well-known process initiated via free radicals, converting a mixture of low-molecular monomers into high-molecular-weight compounds, known as polymers. For further details reference is made to the disclosure of H. G. Elias, Makromoleküle [Macromolecules], Volume 1 and 2, Basle, Heidelberg, New York Hüthig und Wepf. 1990 und Ullmann's Encyclopedia of Industrial Chemistry, 5th edition, headword "Polymerization Processes".

In one preferred embodiment of the present invention, the inventive plastic is obtainable via mass or bulk polymerization of the monomer mixture. Mass or bulk polymerization here means a polymerization process in which monomers are polymerized without solvent, the polymerization reaction therefore being carried out on the undiluted material or in bulk. Processes which contrast with this are polymerization in emulsion (known as emulsion polymerization) and polymerization in a dispersion (known as suspension polymerization), in which the organic monomers are suspended with protective colloids and/or stabilizers in an aqueous phase, and relatively coarse polymer particles are formed. A particular form of heterogeneous-phase polymerization is bead polymerization, which in essence is a type of suspension polymerization.

In principle, the polymerization reaction may be initiated in any manner familiar to the person skilled in the art, for example using a free-radial initiator (e.g. peroxide, azo compound) or via irradiation with UV rays or with visible light, α-radiation, β-radiation or γ-radiation, or a combination of these.

In one preferred embodiment of the present invention, lipophilic free-radical polymerization initiators are used to initiate the polymerization. The free-radical polymerization initiators are in particular lipophilic in order to dissolve in the bulk polymerization mixture. Among compounds which may be used, besides the traditional azo initiators, such as azoisobutyronitrile (AIBN) or 1,1-azobiscyclohexanecarbonitrile, are aliphatic peroxy compounds, such as tert-amyl peroxyneodecanoate, tert-amyl peroxypivalate, tert-butyl peroxypivalate, tert-amyl 2-ethylperoxyhexanoate, tert-butyl 2-ethylperoxyhexanoate, tert-amyl 3,5,5,-trimethylperoxyhexanoate, ethyl 3,3-di (tert-amylperoxy)butyrate, tert-butyl perbenzoate, tert-butyl hydroperoxide, decanoyl peroxide, lauryl peroxide, benzoyl peroxide and any desired mixtures of the compounds mentioned. Among the abovementioned compounds, very particular preference is given to AIBN.

In another preferred embodiment of the present invention, the polymerization is initiated by using known photoinitiators, via irradiation with UV rays or the like. Use may be made here of the familiar, commercially available compounds, e.g. benzophenone, α,α-diethoxyacetophenone, 4,4-diethylaminobenzophenone, 2,2-dimethoxy-2-phenylacetophenone, 4-isopropylphenyl 2-hydroxy-2-propyl ketone, 1-hydroxycyclohexyl phenyl ketone, isoamyl p-dimethylaminobenzoate, methyl 4-dimethylaminobenzoate, methyl o-benzoylbenzoate, benzoin, benzoin ethyl ether, benzoin isopropyl ether, benzoin isobutyl ether, 2-hydroxy-2-methyl-1-phenylpropan-1-one, 2-isopropylthioxanthone, dibenzosuberone, 2,4,6-trimethylbenzoyldiphenylphosphine oxide, bisacylphosphine oxide and other compounds, and the photoinitiators mentioned here may be used alone or in a combination of two or more or in combination with one of the above polymerization initiators.

The amount of the free-radical generators may vary widely. By way of example, amounts preferably used are in the range from 0.1 to 5.0% by weight, based on the weight of the entire composition. Particular preference is given to the use of amounts in the range from 0.1 to 2.0% by weight, in particular amounts in the range from 0.1 to 0.5% by weight, based in each case on the weight of the entire composition.

The polymerization temperature to be selected for the polymerization is obvious to the person skilled in the art. It is primarily determined via the initiator selected and the manner of initiation (thermal, via irradiation, etc.). It is known that the polymerization temperature can affect the properties of a polymer product. For the purposes of the present invention, preference is therefore given to polymerization temperatures in the range from 20.0 to 100.0° C., advantageously in the range from 20.0 to 80.0° C., in particular in the range from 20.0 to 60.0° C. In one particularly preferred embodiment of the present invention, the reaction temperature is increased during the reaction, preferably in stages.

Heat-conditioning at an elevated temperature has also proven to be advantageous, for example from 100 to 150° C., towards the end of the reaction.

The reaction may take place either at subatmospheric pressure or else at superatmospheric pressure. However, it is preferably carried out at atmospheric pressure. The reaction may take place in air or else under an inert gas, preferably with a minimum content of oxygen present, because this content has an inhibiting effect on any polymerization.

In one particularly preferred embodiment of the present invention, the procedure for preparing the inventive high-transparency plastic prepares a homogeneous mixture from the components, these being monomer mixture, initiator and other additives, e.g. lubricants, and then charges these between glass plates whose shape has been predetermined via the subsequent application, e.g. in the form of spectacle lenses or other lenses, prisms or other optical components. The bulk polymerization is initiated via introduction of energy, for example via high-energy radiation, in particular using UV light, or via heating, advantageously in a water bath and for two or more hours. This gives the optical material in its desired form as clear, transparent, colourless, hard plastic.

For the purposes of the present invention, lubricants are additives for charges of plastic materials, such as compression-moulding materials and injection-moulding materials, their function being to increase the slip capability of the materials charged and thus to ease the moulding of the compression-moulding materials. Examples of substances suitable for this purpose are metal soaps and siloxane combinations. The insolubility of the lubricant in plastics causes some of the lubricant to migrate to the surface during processing, where it acts as a release agent. Particularly suitable lubricants, such as non-ionic fluorinated agents with surface activity, non-ionic silicone agents with surface activity, quaternary alkylammonium salts and acidic phosphate esters, are described in EP 271839 A, the disclosure of which is expressly incorporated by reference for the purposes of the present invention.

The invention provides a high-transparency plastic with very good optical and mechanical properties. For example, its transmittance to DIN 5036 is preferably greater than 88.5%, advantageously greater than 89.0%, preferably greater than 89.5%, in particular greater than 90.0%.

The refractive index $n_D$ of the inventive plastic is preferably greater than or equal to 1.57, in particular greater than 1.58 and particularly preferably greater than or equal to 1.6. The refractive index of a medium is generally dependent on the wavelength of the incident radiation and on the temperature. The inventive data for refractive index are therefore based on the standard data specified in DIN 5349.1 (standard wavelength of the (yellow) D line of sodium (about 589 nm)).

According to the invention, the Abbe number of the plastic is preferably >35.0, in particular >36.0, to DIN 53491. The Abbe number is a variable $V_D$ introduced by E. Abbe $$v_D = \frac{(n_D - 1)}{(n_F - n_C)}$$

to characterize the dispersion of an optical medium, where $n_D$, $n_F$ and $n_C$ are the refractive indices of the medium for the Fraunhofer D, F and C lines. D here is the average value for the sodium D lines $\lambda_1$=589.6 nm and $\lambda_2$=589.0 nm, F is the hydrogen line with $\lambda$=486.1 nm and C is the hydrogen line with $\lambda$=656.3 nm. A high Abbe number means a low level of dispersion. Further information concerning the Abbe number can be found by the person skilled in the art in the literature, for example in the Lexikon der Physik [Dictionary of Physics] (Walter Greulich (ed.); Lexikon der Physik [Dictionary of Physics]; Heidelberg; Spektrum, Akademischer Verlag; Volume 1; 1998).

According to one particularly preferred embodiment of the present invention, the plastic has an Abbe number >36.0, advantageously >37.0, in particular >39.0. Plastics which have proven very particularly advantageous here have an Abbe number >40.0, preferably >42.0. According to the invention, plastics with an Abbe number >43.0, in particular >44.0, are of greatest interest.

The Charpy impact strength of the inventive plastic, measured to ISO 179/1fU, is preferably greater than or equal to 4.0, in particular greater than or equal to 6.0 kJ/m², and particularly preferably greater than or equal to 8.0 kJ/m².

The inventive plastic also advantageously has a high Vicat point measured to ISO 306, and therefore maintains its outstanding mechanical properties, in particular its Charpy impact strength and its hardness, even at temperatures above room temperature. The Vicat point of the inventive plastic, measured to ISO 306, is preferably greater than 50° C., advantageously greater than 60° C., in particular greater than 70° C. Vicat points which have proven very particularly advantageous here for the inventive plastic are, measured to ISO 306, greater than 80° C., preferably greater than 90° C., advantageously greater than 100° C., in particular greater than 120° C. For the purposes of one very particularly preferred embodiment of the present invention, the Vicat point of the plastic, measured to ISO 306, is greater than 140° C., preferably greater than 160° C., in particular greater than 180° C.

The maximum of tangent delta of the inventive plastic, measured for the purposes of the present invention by means of torsional vibration measurement to ISO 6721-7, is preferably greater than or equal to 50, advantageously or equal to 70.

Possible fields of use for the inventive high-transparency plastic are obvious to the person skilled in the art. It is particularly suitable for any application destined for transparent plastics. Its characteristic properties make it especially suitable for optical lenses, in particular for ophthalmic lenses.

The following inventive examples and the comparative example serve to illustrate the invention, with no intended resultant restriction.

Synthesis of the Thiomethacrylate Mixture 75.36 g of 1,2-ethanedithiol are weighed into an Erlenmeyer flask with inert gas feed and stirred, and 416.43 g of 13% strength NaOH solution are metered in within a period of 30 minutes at from 25 to 30° C., with water cooling. A brownish, clear solution forms.

178.64 g of methacrylic anhydride and the Na thiolate solution are then metered in parallel at the desired metering temperature within a period of 45 minutes into the initial charge of stirred ethyl acetate/water in the reaction flask. Where appropriate here, inert gas is passed over the mixture. The contents of the flask generally become cooler by about 2° C. at the start of the feed, and a slightly exothermic reaction begins after about 5-10 minutes, meaning that appropriate cooling is applied in order to maintain the desired reaction temperature (35° C.). Once the feed has ended, the mixture is stirred for a further 5 minutes at 35° C. and is then cooled, with stirring, to about 25° C.

The mixture is transferred to a separating funnel and separated, and the lower, aqueous phase is discharged. For work-up, the organic phase is transferred to an Erlenmeyer flask and stirred with ®Dowex M-31 for about 15 minutes, the ion exchanger then being filtered off.

The somewhat cloudy to almost clear crude ester solution is then stabilized with 100 ppm of HQME and concentrated at not more than 50° C. on a rotary evaporator. Where appropriate, the colourless final product is treated at room temperature (20-25° C.) with 0.5% of kieselguhr and stirred for about 10 minutes. The product is then filtered at about 1 bar through a Seitz K800 filter layer and a 0.45 μm filter membrane. This gives about 140 g of colourless, clear ester.

Synthesis of Allyl Polyethylene Glycol Methacrylate 4415.4 g (8.87 mol) of allyl polyethylene glycol (BASF, Clariant), 6213.8 g (62.06 mol) of methyl methacrylate and 2510 mg (500 ppm) of hydroquinone monomethyl ether formed an initial charge and were heated, with stirring and air feed. About 700 g of distillate were drawn off in order to remove water. The amount of methyl methacrylate corresponding to the distillate was then added, as was the catalyst (isopropyl titanate, 1.5% based on alcohol, 66.2 g), and the alcoholysis was carried out. Distillate draw-off was controlled by way of the temperature at the centre of the column. When the temperature at the centre of the column, 80° C., could no longer be maintained, the temperature was increased stepwise to 99° C. The alcoholysis was terminated when the overhead temperature remained constant at 99° C. (reaction time (excluding water-removal): 2.5 h).

After brief cooling, the catalyst was precipitated with sulphuric acid, and sodium carbonate was used for neutralization. The mixture was then filtered through a Seitz K1000 pressure filter. The crude ester was devolatilized on a rotary evaporator.

INVENTIVE EXAMPLES 1 TO 3 AND COMPARATIVE EXAMPLES 1 TO 5

Various mixtures were prepared, the composition of these being seen in Table 1. Alongside the thio-methacrylate mixture described above and an allyl polyethylene glycol methacrylate obtained as described above and having a degree of ethoxylation of about 10, commercially available polyethylene glycol dimethacrylate having a degree of ethoxylation of about 10 from Röhm GmbH & Co. KG was also used. The styrene was purchased commercially from BASF. The mixtures were then cast into a mould and polymerized by using 0.3% by weight of Irgacur 819 and 0.2% by weight of tert-butyl peroctoate in a UV-curing system with a 1200 W high-pressure mercury source. The moulding was then aged for 2 hours at 120° C. in a drying cabinet.

TABLE 1

| | Thiomethacrylate mixture [% by weight] | Styrene [% by weight] | Allyl polyethylene glycol methacrylate [% by weight] | Polyethylene glycol dimethacrylate [% by weight] |
|---|---|---|---|---|
| Inventive Example 1 | 60 | 20 | 20 | — |
| Comparative Example 1 | 60 | 20 | — | 20 |
| Inventive Example 2 | 60 | 25 | 15 | — |
| Comparative Example 2 | 60 | 25 | — | 15 |
| Inventive Example 3 | 80 | — | 20 | — |
| Comparative Example 3 | 80 | — | — | 20 |
| Comparative Example 4 | 80 | 20 | — | — |
| Comparative Example 5 | 100 | — | — | — |

The mechanical and optical properties of the resultant plastics mouldings were measured, the data obtained being presented in Table 2.

TABLE 2

| | Charpy impact strength to DIN ISO 179/1fU [kJ/m$^2$] | Refractive index at 589 nm to DIN 53491 |
|---|---|---|
| Inventive Example 1 | 9.6 | 1.588 |
| Comparative Example 2 | 7.7 | 1.588 |
| Inventive Example 2 | 8.6 | 1.590 |
| Comparative Example 2 | 7.2 | 1.593 |
| Inventive Example 3 | 4.2 | 1.592 |
| Comparative Example 3 | 3.2 | 1.594 |
| Comparative Example 4 | 3.2 | 1.613 |
| Comparative Example 5 | 3.3 | 1.617 |

It is seen that the inventive mixtures can be polymerized to give plastics with high impact strength. In contrast to this, the impact strength of known plastics mouldings is relatively low, and this improvement is attributable to the use of asymmetric monomers.

The invention claimed is:

1. A mixture for preparing transparent plastics, comprising
a) compounds of the formula (I) and/or (II)

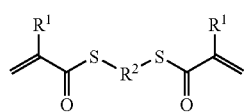

(I)

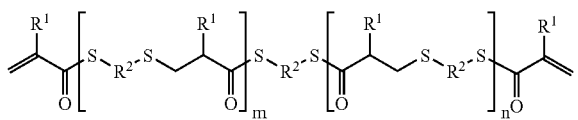

where $R^1$, is independently of the others, is hydrogen or a methyl radical, each $R^2$, is independently of the others, is a linear or branched, aliphatic or cycloaliphatic radical or a substituted or unsubstituted aromatic or heteroaromatic radical and each of m and n, independently of the others, is a whole number greater than or equal to 0, where m+n>0, and b) at least one asymmetric monomer (A) capable of free-radical polymerization with a molar mass of at least 150 g/mol, which contains at least two terminal olefinic groups, wherein at least two of the olefinic groups of the monomer (A) have, in the α- and/or β-position with respect to the olefinic group, atoms which differ in nature and/or number, in the radical which connects the at least two olefinic groups.

2. The mixture according to claim 1, wherein the monomer (A) encompasses at least one allyl group and at least one (meth)acryloyl group.

3. The mixture according to claim 1, wherein the mixture comprises more than 10 mol %, based on the total amount of the compounds of the formula (I) and (II), of compounds of the formula (II) where m+n=2.

4. The mixture according to claim 1, wherein the radical $R^2$ of the formulae (I) and/or (II) is an aliphatic radical having from 1 to 10 carbon atoms.

5. The mixture according to claim 1, wherein the mixture comprises more than 5.8 mol %, based on the total amount of the compounds of the formula (I) and (II), of compounds of the formula (II) where m+n=3.

6. The mixture according to claim 1, wherein the mixture comprises from 0.1 to 50 mol %, based on the total amount of the compounds of the formula (I) and (II), of compounds of the formula (I).

7. The mixture according to claim 1, wherein the mixture comprises more than 30 mol %, based on the total amount of the compounds of the formula (I) and (II), of compounds of the formula (II) where m+n=1.

8. The mixture according to claim 1, wherein the mixture comprises compounds of the formula (II) where m+n>3.

9. The mixture according to claim 1, wherein the total content of compounds of the formula (I) and (II) is at least 5.0% by weight, based on the total weight of the mixture.

10. The mixture according to claim 1, wherein there are at least 5 bonds separating the most adjacent carbon atoms of the at least two olefinic groups from one another.

11. The mixture according to claim 1, wherein the mixture comprises, as monomer (A), at least one compound of the formula (X)

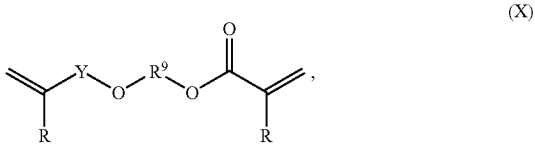

where the radical R is independently a hydrogen atom, a fluorine atom and/or a methyl group, the radical $R^9$ is a connecting group and the radical Y is a bond or a connecting group having from 1 to 1000 carbon atoms.

12. The mixture according to claim 1, wherein the mixture comprises, as monomer (A), at least one compound of the formula (XI)

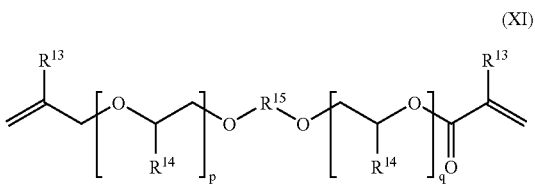

where each $R^{13}$, independently of the other, is hydrogen or a methyl radical, each $R^{14}$, independently of the other, is hydrogen or a methyl radical, $R^{15}$ is a linear or branched, aliphatic or cyclo-aliphatic radical or a substituted or unsubstituted aromatic or heteroaromatic radical, and each of p and q, independently of the other, is a whole number greater than or equal to 0, where p+q>0, and/or of the formula (XII)

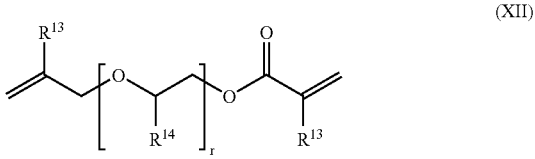

where each $R^{13}$, independently of the other, is hydrogen or a methyl radical, $R^{14}$ is hydrogen or a methyl radical, and r is a whole number greater than 0.

13. The mixture according to claim 12, wherein the mixture comprises from 1 to 40% by weight of the compounds of the formula (XI) and/or (XII), based on the total weight of the monomer mixture.

14. The mixture according to claim 12, wherein the number r in formula (XII) is in the range from 7 to 15.

15. The mixture according to claim 1 wherein the mixture comprises at least one monomer (B) which is copolymerizable with the monomers of the formulae (I) and (II), and also with the monomer (A).

16. The mixture according to claim 15, wherein the mixture encompasses aromatic vinyl compounds and/or (meth)acrylates.

17. The mixture according to claim 16, wherein the mixture encompasses di(meth)acrylates.

18. A process for preparing transparent plastics, comprising polymerizing a mixture according to claim 1.

19. A transparent plastic obtained by a process according to claim 18.

20. The transparent plastic according to claim 19, wherein the refractive index of the plastic to DIN 53491 is greater than 1.58.

21. The transparent plastic according to claim 19 wherein the Abbe number of the plastic to DIN 53491 is greater than 36.

22. The transparent plastic according to claim 19 wherein the impact strength of the plastic to ISO 179/1fU is greater than 6 kJ/m$^2$.

23. The transparent plastic according to any claim 19 wherein the transmittance of the plastic to DIN 5036 is greater than 89.0%.

24. The transparent plastic according to claim 19 wherein its Vicat point measured to ISO 306 is greater than 50.0° C.

25. A method of producing an optical lens comprising utilizing the transparent plastic according to claim 19.

26. An optical lens comprising a transparent plastic according to claim 19.

27. An ophthalmic lens comprising a transparent plastic according to claim 19.

28. The mixture according to claim 1, wherein the monomer (A) contains at least two different olefinic groups selected from the group consisting of an allyl group, an acryloyl group and a methacryloyl group.

29. The mixture according to claim 1, wherein the monomer (A) has at least one terminal allyl group and at least one terminal methacryloyl group.

30. The mixture according to claim 1, wherein the monomer (A) is an allyl polyethylene glycol methacrylate.

31. The mixture of claim 30, wherein the allyl polyethylene glycol methacrylate is present in an amount of from 5 to 35% by weight based on the total weight of the monomer mixture, and from 50-80% by weight of a mixture of the compounds of formula (I) and (II), and from 10 to 30% by weight of styrene.

32. The mixture according to claim 1, wherein the mixture of compounds of formula (I) and (II) is present in an amount of from 60 to 85% by weight, the monomer (A) is present in an amount of 10 to 30% by weight, and an additional monomer (B) is present in an amount of from 10 to 30% by weight, wherein percent by weight is based on the total weight of the mixture of the compounds of formula (I) and (II), the monomer (A), and the monomer (B), wherein the monomer (B) is an ethylenically unsaturated monomer different from the monomer (A).

* * * * *